US008924993B1

(12) United States Patent  
Niebles Duque et al.

(10) Patent No.: US 8,924,993 B1  
(45) Date of Patent: Dec. 30, 2014

(54) VIDEO CONTENT ANALYSIS FOR AUTOMATIC DEMOGRAPHICS RECOGNITION OF USERS AND VIDEOS

(75) Inventors: Juan Carlos Niebles Duque, Barranquilla (CO); Hrishikesh Balkrishna Aradhye, Santa Clara, CA (US); Luciano Sbaiz, Zurich (CH); Jay N. Yagnik, Mountain View, CA (US); Reto Strobl, Walenstadt (CH)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/294,156

(22) Filed: Nov. 10, 2011

Related U.S. Application Data

(60) Provisional application No. 61/412,709, filed on Nov. 11, 2010.

(51) Int. Cl.  
*H04H 60/33* (2008.01)

(52) U.S. Cl.  
USPC ............................................................. 725/9

(58) Field of Classification Search  
None  
See application file for complete search history.

(56) References Cited

U.S. PATENT DOCUMENTS

| | | | |
|---|---|---|---|
| 4,646,145 A | 2/1987 | Percy et al. | |
| 5,790,935 A | 8/1998 | Payton | |
| 6,006,257 A | 12/1999 | Slezak | |
| 6,381,746 B1 | 4/2002 | Urry | |
| 6,774,917 B1 | 8/2004 | Foote | |
| 6,993,535 B2 | 1/2006 | Bolle et al. | |
| 7,620,551 B2 | 11/2009 | Ho | |
| 7,631,336 B2 | 12/2009 | Diaz | |
| 7,813,822 B1 | 10/2010 | Hoffberg | |
| 8,472,662 B2 * | 6/2013 | Muriello et al. ............... 382/100 |
| 2003/0154486 A1 | 8/2003 | Dunn et al. | |
| 2003/0187730 A1 | 10/2003 | Natarajan et al. | |
| 2004/0019900 A1 | 1/2004 | Knightbridge et al. | |
| 2004/0203851 A1 | 10/2004 | Vetro et al. | |
| 2004/0205482 A1 | 10/2004 | Basu | |
| 2004/0215663 A1 | 10/2004 | Liu et al. | |
| 2005/0027766 A1 | 2/2005 | Ben et al. | |
| 2007/0053513 A1 | 3/2007 | Hoffberg | |
| 2007/0086741 A1 | 4/2007 | Ando et al. | |
| 2008/0002892 A1 | 1/2008 | Jelonek et al. | |
| 2008/0036917 A1 | 2/2008 | Pascarella et al. | |

(Continued)

OTHER PUBLICATIONS

Aradhye, H., et al., "Video2text: Learning to annotate video content," IEEE International Conference on Data Mining Workshops, ICDMW'09, 2009, pp. 144-151.

(Continued)

*Primary Examiner* — Nathan Flynn  
*Assistant Examiner* — Omar S Parra  
(74) *Attorney, Agent, or Firm* — Fenwick & West LLP

(57) ABSTRACT

A demographics analysis trains classifier models for predicting demographic attribute values of videos and users not already having known demographics.

In one embodiment, the demographics analysis system trains classifier models for predicting demographics of videos using video features such as demographics of video uploaders, textual metadata, and/or audiovisual content of videos.

In one embodiment, the demographics analysis system trains classifier models for predicting demographics of users (e.g., anonymous users) using user features based on prior video viewing periods of users. For example, viewing-period based user features can include individual viewing period statistics such as total videos viewed. Further, the viewing-period based features can include distributions of values over the viewing period, such as distributions in demographic attribute values of video uploaders, and/or distributions of viewings over hours of the day, days of the week, and the like.

20 Claims, 4 Drawing Sheets

(56) References Cited

U.S. PATENT DOCUMENTS

| | | |
|---|---|---|
| 2008/0097821 A1 | 4/2008 | Chickering et al. |
| 2008/0144943 A1 | 6/2008 | Gokturk et al. |
| 2008/0152231 A1 | 6/2008 | Gokturk et al. |
| 2008/0193016 A1 | 8/2008 | Lim et al. |
| 2008/0307311 A1 | 12/2008 | Eyal |
| 2009/0055862 A1 | 2/2009 | Knoller et al. |
| 2009/0132355 A1 | 5/2009 | Begeja et al. |
| 2009/0150947 A1 | 6/2009 | Soderstrom |
| 2009/0190473 A1 | 7/2009 | Gassewitz et al. |
| 2009/0208106 A1 | 8/2009 | Dunlop |
| 2010/0180218 A1 | 7/2010 | Boston et al. |
| 2010/0333125 A1* | 12/2010 | Eldering et al. ............... 725/14 |
| 2011/0018998 A1 | 1/2011 | Guzik |
| 2011/0030031 A1 | 2/2011 | Lussier |
| 2011/0072114 A1 | 3/2011 | Hoffert et al. |
| 2011/0184807 A1 | 7/2011 | Wang et al. |
| 2011/0288939 A1 | 11/2011 | Elvekrog et al. |
| 2012/0102033 A1 | 4/2012 | Sarshar et al. |

OTHER PUBLICATIONS

Bennett, J., et al., "The netflix prize," In Proceedings of KDD Cup and Workshop, KDDCup'07, Aug. 12, 2007, pp. 1-6.

Brezeale, D., et al., "Learning video preferences from video content," In Proceedings of the 8th international work-shop on Multimedia data mining:(associated with the ACM SIGKDD 2007), Aug. 17, 2007, 9 Pages.

Chang, Y.L., et al. "Integrated Image and Speech Analysis for Content-Based Video Indexing," IEEE Proceeding of MULTIMEDIA, 1996, pp. 306-313.

De Bock, K., et al., "Predicting Website Audience Demographics for Web Advertising Targeting Using Multi-Website Clickstream Data," Fundamenta Informaticae, 2010, pp. 49-70, vol. 98, No. 1.

Flickner, M., et al., "Query by Image and Vido content: The QBIC System," Computer, Sep. 1995, pp. 23-32.

Freund, Y., et al., "A desicion-theoretic generalization of on-line learning and an application to boosting," In Computational learning theory, 1995, pp. 23-37. Springer.

Hacker, S., et al., "Matchin: eliciting user preferences with an online game," In Proceedings of the 27th international conference on Human factors in computing systems, CHI Classifying and Recommending Content, Apr. 8, 2009, pp. 1207-1216.

Hu, J., et al., "Demographic prediction based on user's browsing behavior," In Proceedings of the 16th international conference on WorldWideWeb, May 8-12, 2007, pp. 151-160, Track: Data Mining, Session: Predictive Modeling of Web Users.

Li, L., "Multiclass boosting with repartitioning," In Proceedings of the 23rd international conference on Machine learning, 2006, pp. 569-576.

Makadia, A., et al., "A New Baseline for Image Annotation," In: European Conference on Computer Vision, 2008, 14 pages.

Neapolitan, R. E., "Learning Bayesian Networks," Prentice Hall, Inc., Upper Saddle River, NJ, USA, 2003, Cover page and Table of Conents.

Pazzani, M., "A framework for collaborative, content-based and demographic filtering," Artificial Intelligence Review, 1999, pp. 393-408, vol. 13, No. 5.

Song, Y., et al., "Taxonomic classification for web-based videos," IEEE Conference on Computer Vision and Pattern Recognition (CVPR), 2010, pp. 871-878.

Toderici, G., et al., "Finding meaning on YouTube: Tag recommendation and category discovery," IEEE Conference on Computer Vision and Pattern Recognition (CVPR), 2010, pp. 3447-3454.

Zeng, L., et al., "Storage Active Service: Model, Method and Practice," Proceedings of the Japan-China Joint Workshopon Frontier of Computer Science and Technology (FCST'06), 2006, 8 pages.

PCT International Search Report and Written Opinion, PCT/US2009/068108, Feb. 24, 2010, 10 pages.

Search Results prepared by USPTO on Jan. 27, 2012, 68 pages.

Anderson, R., A local algorithm for finding dense subgraphs, In Proc. 19th Annual ACM-SIAM Symposium on Discrete Algorithms, 2008, pp. 1003-1009.

Blum, A. et al., "Combining labeled and unlabeled data with co-training," In Proc. 11th Annual Conference on Computational Learning Theory, COLT, Jul. 1998, pp. 92-100.

Davison, B. D., "Topical locality in the web," In Proc. 23rd Annual International ACM SIGIR Conference on Research and Development in Information Retrieval, 2004, pp. 272-279.

Dekel, O., et al., "Large margin hierarchical classification," Proceedings of the 21 st International Conference on Machine Learning, Banff, Canada, 2004, 8 pages.

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.

Fan, R.-E., et al., "Liblinear: A library for large linear classification," Journal of Machine Learning Research, 2008, pp. 1871-1874, vol. 9.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. $17^{th}$ International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 pages.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Neapolitan, R. E., et al., "Learning Bayesian Networks," Prentice-Hall, Inc., Upper Saddle River, NJ, USA, 2003, Cover page and Table of Contents, 7 pages.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

(56) References Cited

OTHER PUBLICATIONS

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

Mei, T., et al., "VideoSense-Towards Effective Online Video Advertising," Proceedings of the 15$^{th}$ International Conference on Multimedia, Sep. 23, 2007, pp. 1075-1084.

European Search Report for European Patent Application No. EP 09839466.1, Apr. 5, 2013, 9 pages.

Brodley, C., et al., "Identifying and Eliminating Mislabeled Training Instances," AAAI/IAAAI, 1996, pp. 799-805.

* cited by examiner

VIDEO CONTENT ANALYSIS FOR AUTOMATIC DEMOGRAPHICS RECOGNITION OF USERS AND VIDEOS

CROSS REFERENCE TO RELATED APPLICATIONS

The application claims the benefit of Provisional Application No. 61/412,709, filed on Nov. 11, 2010, which is hereby incorporated herein by reference.

BACKGROUND

1. Field of Art

The present invention generally relates to the field of digital video, and more specifically, to methods of correlating demographic data with characteristics of video content.

2. Background of the Invention

Video hosting sites, such as YouTube, currently have millions of users and tens of millions of videos. Users may sometimes have difficulty in determining which videos would be of interest to them and may be daunted by the sheer volume of videos available for viewing. Thus, the ability to suggest which videos would be of interest to a given user in view of the user's demographic attributes would be highly valuable. Similarly, the ability to infer the demographic attributes of a user based on past videos viewed by the user would be beneficial for a number of applications, such as providing user-specific content based on user demographics for users who have not already provided such data in a user profile.

However, conventional systems typically merely rely on external metadata associated with videos, such as keywords or textual video descriptions, to predict demographic groups that would be interested in a particular video, or to estimate the demographic attributes of a particular user. For example, conventional systems might recommend videos having keywords matching those specified in a viewer profile as being of interest to that viewer. However, if the video is new and has not yet been viewed and rated, and if the associated title is "spam" that misrepresents the true content of the video, then the conventional approach produces spurious suggestions. Thus, one shortcoming of conventional approaches is that they rely on external metadata that may be false when assessing the pertinence of a given video to a particular viewer, rather than examining actual data related to past viewings of video, such as content of the videos viewed, or information on user viewing sessions themselves.

SUMMARY

A video demographics analysis system produces demographic classifier models that predict the demographic characteristics associated with a video using features derived from a number of videos viewed by users of the system. (Such users are hereinafter equivalently referred to as "viewers".) Additionally and/or alternatively, the video demographics analysis system produces demographic classifier models that predict the demographic characteristics of a viewer using features derived from time periods during which the viewers view videos, as well as from the individual videos viewed during those time periods.

In one embodiment, the system creates a classifier model that predicts the demographic characteristics associated with a video—that is, the demographic groups to which the video is expected to most strongly appeal. The demographic groups may be defined by demographic attributes such as age, gender, household income, and the like. For each of the demographic groups of interest, the system selects a training set of videos that is representative of the demographic group. Further, the system extracts, from each video in the training set, a number of features that characterize the video. The types of features selected may include content features directly derived from audiovisual content of the video, textual metadata features, and features related to the demographics of the system user that uploaded the video. Based on the selected features, the classifier model learns the demographic attributes associated with the selected features. The video classifier model may then be applied to a given video for which demographic attributes are not already known to predict the demographic groups to which the video is expected to most strongly appeal.

In one embodiment, the system creates a classifier model that predicts the demographic characteristics of a viewer of videos based on features derived from a prior time period during which the viewer viewed videos. The features include features related to the individual videos viewed during the time period, such as content features directly derived from audiovisual content of the video, textual metadata features, features related to the demographics of the system user that uploaded the video, and score features derived from the classifier model that predicts the demographic characteristics of the video. Additionally, the features include features derived from characteristics of the time period itself, such as metrics describing viewing information (including the average number of unique videos viewed per day, the number of videos watched during the session, and the like) and/or the distribution of video viewings over time such as hours of the day or days of the week). Based on the selected features, the user classifier model learns the demographic attributes with the selected features. The user classifier model may then be applied to the viewing history of a system user for whom demographic attributes are not already known to predict the demographic groups to which the user belongs.

The training of the video classifier models and the user classifier models may be performed independently. That is, the system could train either, or both. In one embodiment, the data derived from application of the video classifier models may be applied as one input for training the user classifier models.

Application of the classifier models to predict the demographic groups of a video and/or a user has a number of useful applications. For example, the ability to predict the demographic group of a user permits the system to provide user-specific content based on the user's determined demographic group, even when there is little or no existing demographic information about that user. For instance, the system can provide recommendations on videos tending to appeal to the user's demographic group, or advertisements that are relevant to that demographic group. As another example, the system can apply the video classifier models to predetermine which videos would be most appealing to a particular demographic group. Then, when a user belonging to that demographic group is using the system, the system can recommend one of the predetermined videos to that user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 3 illustrates the components of the demographics analysis module of FIG. 1, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
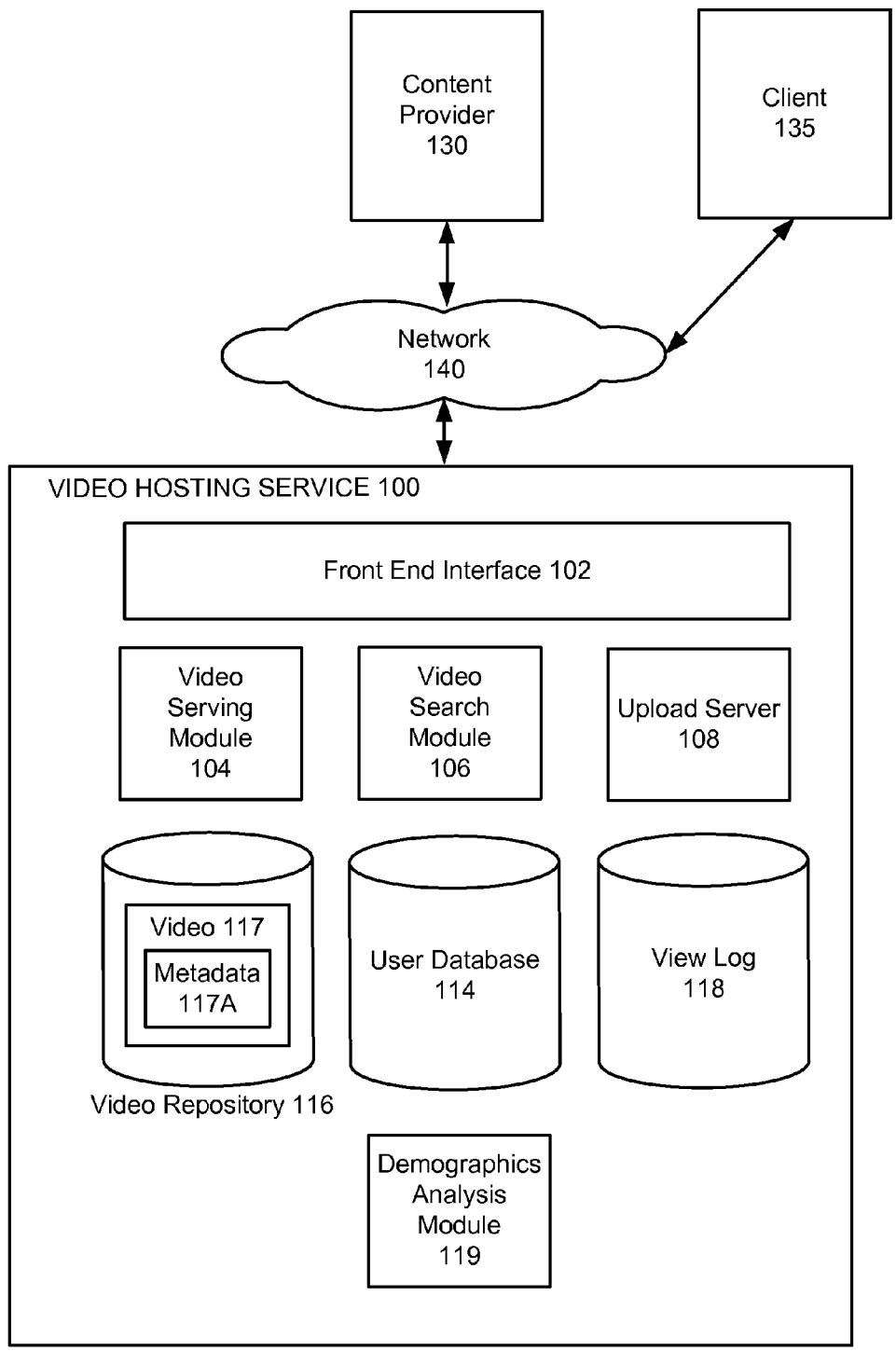
FIG. 1 illustrates the architecture of a video demographics analysis system according to one embodiment.

FIG. 1 is a block diagram of an example video hosting service 100 in which video volumes can be analyzed and labeled, according to one embodiment. The video hosting service 100 represents a system such as that of YOUTUBE that stores videos provided by content providers 130 and makes the videos available to clients such as the client device 135. The video hosting service 100 thus communicates with a plurality of content providers 130 and client devices 135 via a network 140 to facilitate hosting of video content between users. Note that for the sake of clarity FIG. 1 depicts only one instance of content provider 130 and client device 135, though there could be any number of each.

The video hosting service 100 additionally includes a front end interface 102, a video serving module 104, a video search module 106, an upload server 108, a video repository 116, a user database 114, and a view log 118. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE website, found at www.youtube.com. Other video hosting sites are known, as well, and can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting service 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a smart phone, a laptop computer, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a content provider 130. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4/H.264, WMV, WebM, and the like. Further, in addition to their audiovisual content, the videos 117 may—but need not—have associated metadata 117A, e.g., textual metadata such as a title, description, and/or tags provided by a user who uploaded the video via content provider 130, as well as a unique identifier of that user. Various approaches may be used to extract semantically meaningful labels (e.g., "penguin", "golf", "jane austen", "mortgage") from the metadata 117A, such forming n-grams comprising some number of adjacent words from the metadata.

In some embodiments, the user database 114 is responsible for maintaining a record of all registered users of the video hosting service 100. Registered users include content providers 130 and/or users who simply view videos on the video hosting service 100. Each content provider 130 and/or individual user registers account information including login name, electronic mail (e-mail) address and password with the video hosting server 100, and is provided with a unique user ID. Additionally, the user can register demographic account information, such as the user's age, gender, location, hobbies, and any other information characterizing the user. Users need not register demographic information, so this information may be unknown for a given registered user. The account information is stored in the user database 114.

The view log 118 stores information describing each access to any given video 117 by any user. Thus, each video effectively has an associated list of viewers. If the viewer is anonymous—that is, has not established his or her identity by first logging in to the video hosting service 100—data such as IP address or an ID stored in a cookie can still provide a means of observing the anonymous viewer's viewing habits over time. In one embodiment, each viewers is identified with an anonymized viewer ID that is assigned to each individual viewer to keep viewer identities private, such as an opaque identifier such as a unique random number or a hash value. The system then can access each viewer's demographic information without obtaining his or her identity. In an alternative embodiment, the actual identity of the viewers may be known or determinable. In any case, for each viewer, the access log 118 tracks the viewer's interactions with videos. In one embodiment, each entry in the access log 118 identifies a video being accessed, a time of access, the unique ID the viewer, a viewer ID if available, cookies, the viewer's search query that led to the current access, and data identifying the type of interaction with the video. Interaction types can include any viewer interactions in the viewer interface of the website, such as playing, pausing, favoriting, rewinding and sharing a video, and adding a video to a playlist. The various viewer interaction types are considered viewer events that are associated with a given video. For example, one entry might store that a viewer at a given IP address started viewing a particular video at time 0:00:00 and stopped viewing at time 0:34:29.

The video hosting service 100 further comprises a demographics analysis module 119 that analyzes the videos 117 and prior video viewing periods as described in the view log 118 and, based on the analysis, generates classifier models that predict the demographic attributes of a particular video or user. The demographics analysis module 119 and its operations are described in more detail below with respect to FIGS. 2A, 2B, and 3.

Figure 2A:
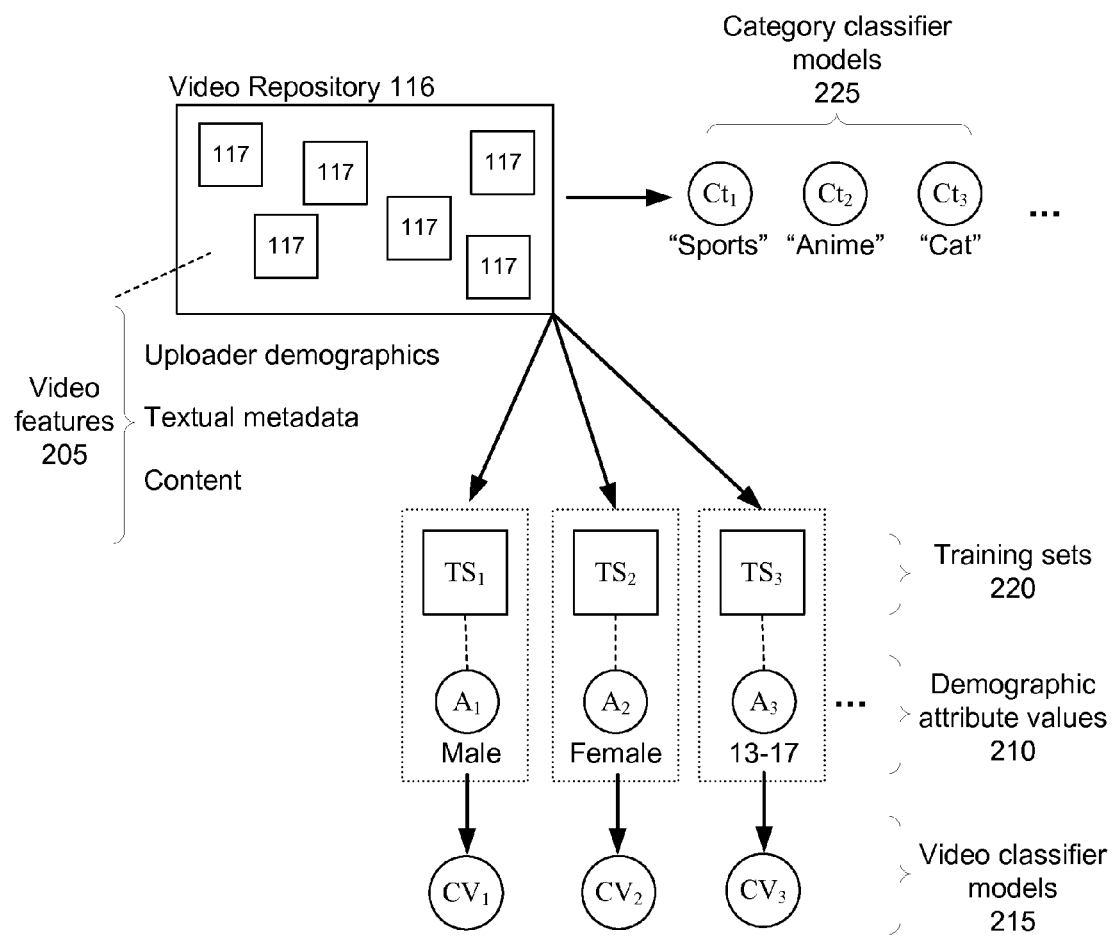
FIGS. 2 and 3 are data flow diagrams illustrating the input, processing, and output associated with training of video classifier models and user classifier models, respectively, according to some embodiments.

FIG. 2A is a data flow diagram representing the relationships and derivations of the various types of data analyzed, produced, and/or applied by the demographics analysis module 119 when generating demographic classifier models for videos, according to one embodiment.

The process begins with the set of videos 117 from the video repository 116, as depicted in FIG. 1. There is also a predetermined set of demographic attributes values 210, each of which represents one possible value of a demographic variable. For example, the demographic attribute values depicted in the example of FIG. 2A include the attribute values "Male" and "Female" (values corresponding to the demographic attribute "Gender"), and the attribute value "13-17", representing the range from age 13 to age 17 (a value corresponding to the demographic attribute "Age"). It is appreciated that for simplicity, FIG. 2A depicts only three distinct demographic attribute values. In practice, there could be many more, and/or different, demographic attribute values, such as a full set of age range of values, a number of different discrete values representing different interests, a set of locations (e.g., geo-codes, zip codes, etc.), and the like.

In order to train the video classifier models 215, a training set 220 of videos 117 is first produced for each demographic attribute value 210. Specifically, for a given demographic attribute value, the demographic analysis module 119 identifies a set of videos 117 that are representative of that demographic attribute value. More detail on the formation of training sets for learning video demographics is provided below with respect to the training set formation module 305 of FIG. 3.

For each video, the demographic analysis module 119 determines a set of features that characterize the video. Different types of video features 205 may be employed in different embodiments. In one embodiment, for example, the video features 205 include demographics of the uploader of the video, textual metadata of the video, and content features derived directly or indirectly from audiovisual content of the video. In another embodiment, category classifier models 225 are additionally trained, each corresponding to a particular phrase, such as "sports", "anime", or "cat", as depicted in FIG. 2A. The category classifier models 225 can then be applied to a video, thereby obtaining a corresponding set of scores that serve as additional features for the video. More detail on the video features is provided below with respect to the feature determination module 310 of FIG. 3.

A video classifier model 215 is then trained for the demographic attribute values using the features of the videos in the corresponding training set. When the video classifier model 215 is applied to a given video, it determines whether (or to what degree) the video is associated with the demographic attribute(s) assigned to the classifier. More detail on the training is provided below with respect to the training module 320 of FIG. 3.

Figure 2B:
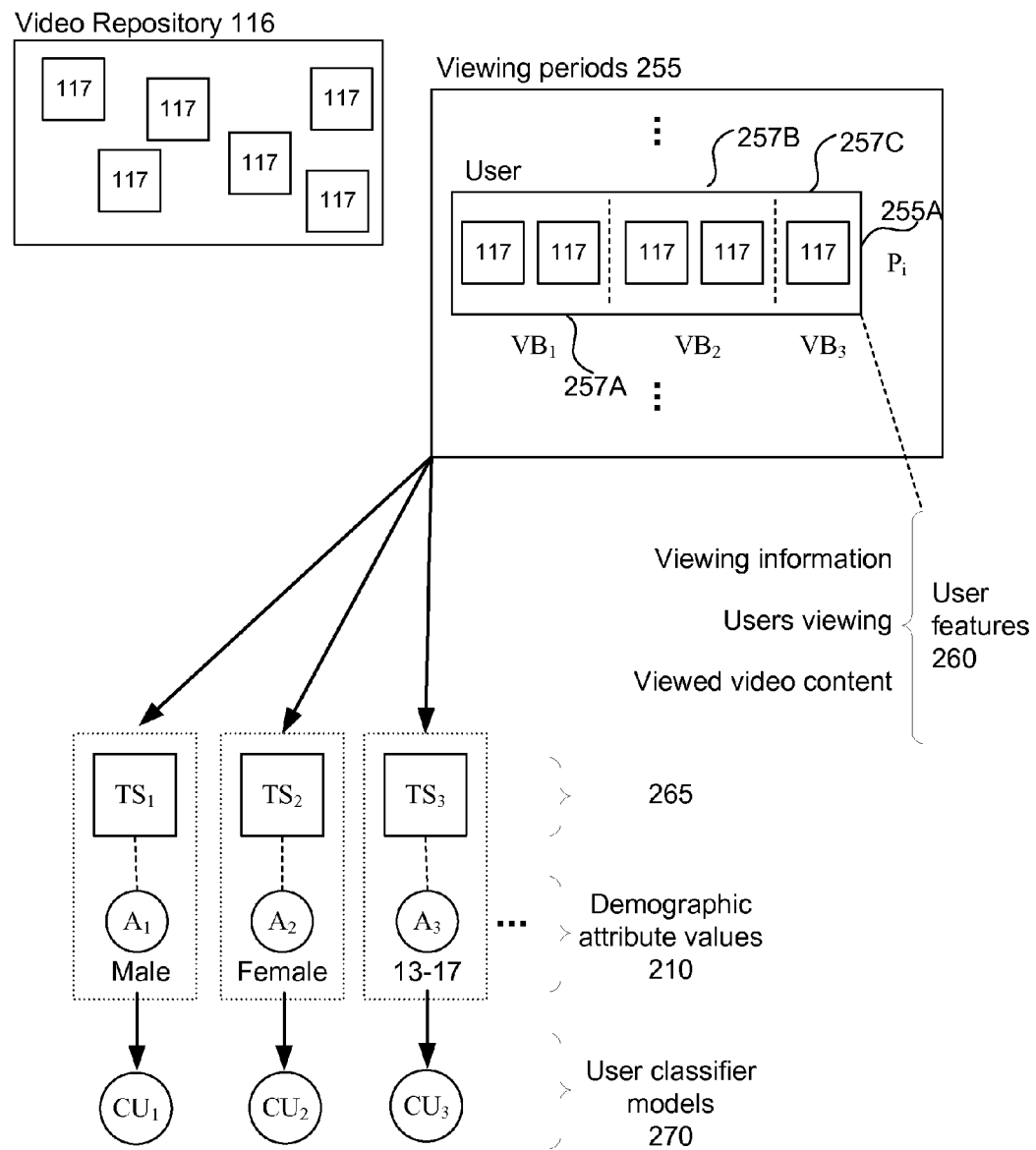

FIG. 2B is a data flow diagram representing the relationships and derivations of the various types of data analyzed, produced, and/or applied by the demographics analysis module 119 when generating demographic classifier models for users, according to one embodiment.

As with the generation of demographic classifier models for videos of FIG. 2A, the process begins with the set of videos 117 from the video repository 116, and also with a predetermined set of demographic attributes values 210 for which classifier models are trained. Additionally, the generation of demographic classifier models for users also begins with a set of viewing periods 255 that provide information on viewing histories of users. Specifically, the viewing periods 255 comprise, for each of a number of different users, a set of videos 117 viewed during a particular time period. For instance, the example viewing period 255A depicted in FIG. 2B comprises five videos, divided into three sets of videos $VB_1$ to $VB_3$, termed "view-blocks," each view-block having a set of videos viewed nearby in time to each other. For example, the two videos of $VB_1$ might have been viewed within 15 minutes of each other, whereas the two videos of $VB_2$ might both have been viewed at least several hours after the videos of $VB_1$, causing the two sets of videos to be considered separate view-blocks due to the significant amount of time between the viewings of their respective videos.

The period to which a given viewing period 255A corresponds need not be within a single user session, such as the time period between a login and corresponding log out by the user in question. Rather, the period can be of any desired length, such as a one-week time span, a two-day time span, or the like.

As with training of the video classifier models of FIG. 2A, in order to train the user classifier models 215 a training set 265 is first produced for each demographic attribute value 210. Specifically, for a given demographic attribute value, the demographic analysis module 119 identifies a set of viewing periods 255A most representative of that demographic attribute value. More detail on the formation of training sets for learning user demographics is provided below with respect to the training set formation module 305 of FIG. 3.

Each of the viewing periods 255A corresponds to a particular user, and hence the information associated with a viewing period 255A is used as a source of user features characterizing users. Many different types of user features 260 may be extracted from the viewing periods 255, such as information about the viewings during the period, about the users associated with the videos that were viewed, or about the content of the videos that were viewed. More detail on the user features 260 is provided below with respect to the feature determination module 310 of FIG. 3.

A user classifier model 270 is then trained for the demographic attribute values. When the user classifier model 270 is applied to viewing period information 255A of a user with unknown (of partially unknown) demographic attributes, it predicts whether (or with what probability) the user has one or more of the demographic attribute values 210. More detail on the training is provided below with respect to the training module 320 of FIG. 3.

Components of the Demographic Analysis Module

Figure 3:
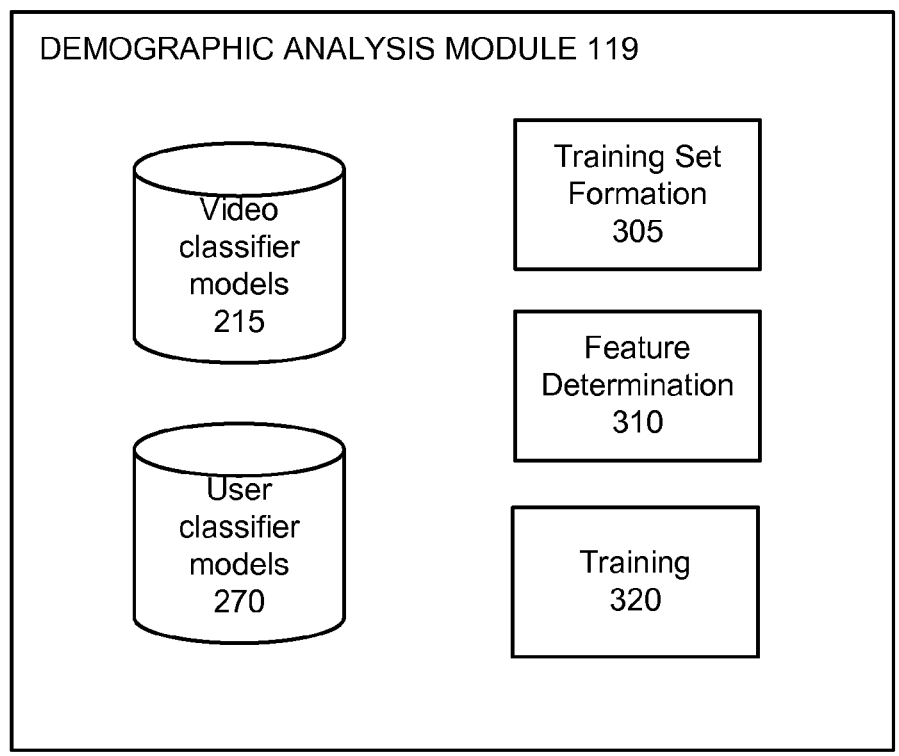

FIG. 3 illustrates the various components of the demographic analysis module 119 of FIG. 1, according to one embodiment.

Training Set Formation

The training set formation module 305 forms training sets used when training the video classifier models 215 or the user classifier models 270.

In the context of training video classifier models 215, the training set formation module 305 forms training sets of videos 117 with associated demographic attribute values. In one embodiment, the most representative videos are deemed to be the videos having the greatest proportion of viewers with a given demographic attribute value. Specifically, the view log 118 is consulted to identify, for each video, the viewers who viewed that video (either at any time, or during some particular time). Then, for each of these viewers, the user database 114 is consulted to identify the value of the demographic attribute for the viewer, and the percentage of viewers having the specified demographic attribute value is computed. Thus, for example, when producing the training set for the value "Female" for the demographic attribute "Gender", the demographic analysis module 119 determines, for each video, the percentage of viewers that were female. The videos may then be sorted according to the percentage of viewers having that demographic attribute value, and some number of the videos with the top percentage selected, such as some fixed number of top videos, or all top videos over some threshold percentage. This set of top videos for a particular demographic attribute value forms the positive training set for that attribute value. The corresponding negative training set is formed out of videos 117 other than the top videos, such as a randomly-selected set of other videos, or some number or percentage of the videos having the lowest percentage for that demographic attribute value.

In the context of training user classifier models 270, the training set formation module 305 forms training sets of viewing periods 255A, each viewing period corresponding to a distinct user. The training set formation module 305 identifies, as the positive training set for a given demographic attribute value, some or all of the viewing periods 255A for which the associated user has that demographic attribute value. Similarly, a negative training set is formed from a subset of the viewing periods 255A not in the positive training set.

In one embodiment, the training set may correspond to a combination of any number of demographic attribute values, rather than a single demographic attribute value. For example, a training set may be formed such that the selected videos 117 (and/or viewing periods 255A) have each of the desired demographic attribute values, such as the value "Female" for the attribute "Gender," and the value "13-17" for the attribute "Age."

Features Used in Training

The feature determination module 310 derives different types of features from videos 117 than it does from viewing periods 255A.

(i) Video features

In one embodiment, the features for a video include demographic attribute values of the uploader of the video. For example, the feature determination module 310 can consult the user database 118 to determine the demographic attribute values of the uploader. If no such attribute values are specified, the video may either be discarded from its corresponding training set(s), or else feature values corresponding to "no information" may be used.

The features for a video may further include textual metadata, such as the video title and any tag words or phrases assigned to the video. For example, the textual metadata 117A of a video may be compared to a predetermined list of words or phrases, and a vector may be constructed that specifies, for each word/phrase, whether (or how many times) the textual metadata contains that word or phrase.

The features for a video may further include content features derived directly or indirectly from audiovisual content of the video. For example, such content features can include features related to visual properties, such as features sampled using a Laplacian-of-Gaussian (LoG) or Scale Invariant Feature Transform (SIFT) feature extractor, a color histogram computed using hue and saturation in HSV color space, motion rigidity features, texture features, filter responses (e.g., derived from Gabor wavelets), including 3D filter responses, or edge features using edges detected by a Canny edge detector. Other types of visual features would be known to one of skill in the art and may be used as well, such as feature descriptors including GLOH (Gradient Location and Orientation Histogram), LESH (Local Energy based Shape Histogram), HOG (Histogram of Oriented Gradients), or SURF (Speeded Up Robust Features) features. Content features can also include features related to audio properties, such as Stabilized Auditory Image (SAI) features and audio spectrograms.

Additionally, features may be derived indirectly from the audiovisual content, such as by training and applying classifiers models to the content. In one embodiment, the demographic analysis module 119 applies category classifier models 225 for particular predetermined phrases—such as "sports", "anime", or "cat", as extracted from metadata 117A of some set of the videos 117—to the videos 117, and for each video, obtains a vector of scores. Each score corresponds to one of the category classifiers and represents whether, or how strongly, the video represents the corresponding category. Thus, the score vectors characterize the various categories that the videos represent.

The category classifiers can be trained either by the demographics analysis module 119, by some other module of the video hosting service 100, or by another system entirely. To accomplish the training, a positive training set is formed for each phrase, the positive training set containing videos having that phrase (e.g., within their textual metadata 117A). A negative training set of videos not having the phrase is also formed for each phrase. Features, such as those described above, are extracted for each of the videos in the positive and negative training sets and are provided as input to an ensemble learning algorithm, such as Support Vector Machines (SVM), boosting algorithms such as AdaBoost, or the like. The output of the learning algorithm is, for each category phrase, the corresponding category classifier model.

(ii) Viewing Period Features

In one embodiment, the features for a viewing period include information about the viewings during the period, the users associated with the videos that were viewed, and the content of the videos that were viewed, although it is appreciated that other and/or different types of features could likewise be employed. The information about the viewings during the period includes, for example, individual statistical measurements, such as:

the number of videos viewed during the viewing period (whether distinct or not);

the number of distinct videos viewed during the viewing period;

the ratio of unique videos viewed to the total number of videos viewed during the viewing period;

the ratio of days during the time period that have at least one video viewed to the total number of days during the time period;

the average number of video views per day during the time period, for days during which at least one video was viewed; and the average number of unique video views per day during the time period, for days during which at least one video was viewed.

The individual statistical measurements also include analysis of the view-blocks within the time period. In one embodiment, the view-blocks are identified by sorting the video viewings in chronological order, forming a new view-block whenever the start time of the viewing of one video is more than some threshold amount of time (e.g., 30 minutes) after the end time of the viewing of the preceding video. Thus, each view-block conceptually represents a set of videos viewed during a single sitting. View-block features—statistical measurements based on view-blocks—include:

the average, median, and maximum number of videos viewed per view-block of the viewing period;

the average, median, and maximum time duration of the view-blocks of the viewing period;

the number of view-blocks of the viewing period; and the average number of view-blocks per day during the time period, for days during which at least one video was viewed.

The information about the viewings during the period can further include distributions representing when the videos were watched during the time period. Such distributions include, for example:

a distribution of viewings over hours of the day (e.g., a number of viewings for each of the 24 distinct hours);

a distribution of viewings over days of the week (e.g., a number of viewings for each of the seven days of the week); and the distribution of viewings over the view-blocks of the time period (e.g., for the example viewing period 255A of FIG. 2B, the distribution would be <2, 2, 1>, reflecting the fact that $VB_1$, $VB_2$, and $VB_3$ contain two, two, and one videos, respectively.

Such distributions characterize the viewing habits of the given user with respect to viewing times and viewing quantity. In practice, users from different demographic groups tend to have significantly different viewing habits, and hence the distributions are useful for distinguishing different groups. For example, a young adult is more likely than an older adult to view a large number of videos in a row, and teenagers tend not to view videos during school hours but may begin to view videos shortly after school ends.

The information about the users associated with the videos that were viewed includes distributions of the possible values of the demographic attributes of the users who uploaded the different videos. As when deriving features for videos, as described above with respect to FIG. 2A, the demographic attribute values could be, for example, the values "Male" and "Female" for the "Gender" attribute, values such as "13-17", "18-21", "21-25" for the "Age" attribute, and the like. For example, a distribution for the "Gender" attribute over a particular time period and for a particular viewer might indicate that 70% of the video uploaders were female and 30% were male. In practice, the demographic attribute values of the uploaders of the videos tend to be strongly correlated with those of the viewers of the videos, and hence such distributions are very effective features for purposes of training classifier models.

Information about the content of the videos that were viewed includes scores derived from application of previously-trained classifiers models to content of the videos viewed during the time period. For example, in one embodiment the feature determination module 310 applies each of the category classifier models 225 of FIG. 2A to each video, the result being a per-video vector of scores, each score indicating whether (or how strongly) the video represents the category corresponding to the classifier model.

Similarly, in one embodiment the feature determination module 310 additionally and/or alternatively applies the video classifier models 215 of FIG. 2A that were trained based on individual videos. Specifically, the video classifier models 215 are applied to each of the videos viewed during the time period, resulting in a per-video vector of scores, one score for each demographic attribute value. For example, for a given video, there might be a score for a "Gender:Male" classifier model, a "Gender:Female" classifier model, and a classifier model for each of a number of distinct age ranges. In one embodiment, each score is binned into one of N score ranges (e.g., N=10), resulting in an N-dimensional bit vector with exactly one bit set for the score. Then, for each demographic attribute value, the score bit vectors are added together, resulting in a distribution of score values for that demographic attribute value. For example, the distribution of the scores for the "Gender:Male" classifier model might indicate that 15% of the videos are in the lowest tenth of the score range, 10% of the videos are in the next tenth, 8% are in the next tenth, and so on.

Classifier Model Training

In one embodiment, the demographic analysis module 119 comprises a training module 320 that trains a separate video classifier model 215, a separate user classifier model 270, or both, for each of the demographic attribute values, as depicted in FIGS. 2A and 2B.

When training a video classifier model 215, the training module 320 accepts as input the positive and negative training sets of videos produced by the training set formation module 305, including the features produced from the videos by the feature determination module 310. The training module 320 applies ensemble classifier training algorithms, such as Support Vector Machines (SVM), or boosting algorithms such as AdaBoost used to improve the performance of other training algorithms, to train the video classifier models 215. Then, when the video classifier model 215 for a particular demographic attribute value is applied to a video, it determines whether (or to what degree) its associated demographic attribute value represents the video. In other embodiments, to infer continuous attributes (e.g., age) the model 215 is trained using regression analysis, and when applied to a video determines the quantity (and possibly the precision of the estimation) associated to the attribute 210 that best represents the video.

When training a user classifier model 270, the training module 320 accepts as input the positive and negative training sets of viewing periods 255 produced by the training set formation module 305, including the features produced from the videos by the feature determination module 310. As when training the video classifier models 215, the training module 320 applies ensemble classifier training algorithms, such as Support Vector Machines (SVM), or boosting algorithms such as AdaBoost, to train the user classifier models 270. Then, when the user classifier model 270 for a particular demographic attribute value is applied to a prior viewing period 255A of a user, it determines with what degree of probability the user has that demographic attribute value. In other embodiments, to infer continuous attributes the model 270 is trained using regression analysis, and when applied to a user viewing period 255A determines the continuous attributes 210 and with what degree of precision.

Applications of the Classifier Models

The video classifier models 215 and/or the user classifier models 270 may be used within the video hosting service 100 in a number of different manners.

One usage scenario is the prediction of the demographic attributes for users about whom little or no demographic information is already known, as may be the case for anonymous users who have not logged in, or for logged-in users who did not provide demographic information as part of the initial registration process. For example, the demographics analysis module 119 might predict, for a given anonymous user, that the user's viewing history over some prior time period indicates with strong probability that the user is a female with an age between 13 and 17 years. As a result, the video hosting service 100 can (for example) provide the user with content relevant to someone in that demographic group, such as a video previously determined to correspond strongly to the demographic group, or an advertisement designed for the demographic group.

Another usage scenario is prediction of demographic attribute values for a video, such as newly submitted video. In this scenario, a video that has not been previously classified for its demographic attributes is received. This can be a video that has been previously uploaded to the video hosting service 100, or a video that is currently in the process of being uploaded. Features are extracted from the video by the feature determination module 310 in the same manner as the features were extracted from videos when training the video classifier models 215. Then, the video classifier models 215 are applied to the extracted features, resulting in a set of scores, one for each demographic attribute value (or combination thereof, such as Age-Gender combinations). The ability to obtain predicted demographic distributions with respect to a given video has various useful applications.

A second usage scenario, related to the first scenario, is to identify top values of a demographic attribute of interest for which a new video would be likely be relevant. For example, when a video is analyzed the probabilities that a viewer would be of the various ages within the age demographic category could be computed as in the first scenario, the probabilities sorted, and a determination made that the video appeals most strongly to people of the age range(s) with the top probability, e.g., 13-17 year olds.

Another usage scenario is to predict, for a given set of demographic attribute values, which videos would be of interest to viewers with such demographics. This is useful, for example, to create a list of recommended videos for such a viewer. This scenario involves further processing of the demographic probability data to identify the top-scoring videos for a given demographic value, and the processed data can then be used as one factor for identifying what videos may be of interest to a given viewer. For example, when a new video is submitted, the demographics analysis module 119 computes a set of demographic values having the highest match probabilities for the video for categories of interest. For instance, for a video containing content related to social security benefits, the highest value for the gender category might be female with match strength 0.7, the highest attribute values for the age category might be the age ranges 60-64 and 65-69, with respective match strengths 0.8, and 0.7, and the highest attribute values for the gender-age combination category might be female/60-64 and female/65-69, with respective match probabilities 0.95 and 0.9. These computed demographic probabilities can be stored for each video, e.g. as part of the video repository 116, and a list of the videos with the top scores for each demographic category attribute stored. For example, the top-scoring videos for people of age 41 might be a video trailer for the film "Pride & Prejudice" and a video on landscaping, and the top-scoring videos for males with college degrees might be a video about mortgage foreclosures and an instructional video on golf.

These lists of top videos for different demographics can then be applied to identify recommendations for related videos. For example, if a viewer is viewing a video about the Antarctic with submitter-supplied description "Look at the cute penguins," the demographics analysis module 119 can refer to his profile, determine that he is a male college graduate, and potentially recommend the videos on mortgage foreclosures and golf instruction, based upon the videos associated with these demographics via the classifier model. If the viewer is anonymous, or key demographic data about the user is not already known, then the user classifier models 270 can first be applied to determine the user's probable demographics, and then the recommendations can be made based on the probable demographics. These recommendations can be made in addition to those recommended based on other data, such as the keyword "penguins," keywords specified in the viewer's profile (if any) as being of interest to that viewer, and the like. The demographics-derived recommendations can be displayed unconditionally, in addition to the other recommendations, or conditionally, based on comparisons of computed relevance values, for example. Similarly, the various recommendations may be ordered according to computed relevance values, with each recommendation source—e.g. derived from demographics, or from keyword matches—possibly having its own particular formula for computing a relevance value.

Still another usage scenario is serving demographic queries, i.e. providing anonymized demographic information across videos. For example, a user (either a human or a program) could submit a query requesting the average age of the viewers across all the videos in the video repository 116, or some subset of these videos, the answer factoring in estimated ages of users who otherwise lack profiles. As another example, a user could submit a query requesting the top 10 videos for women aged 55 or older. The user classifier models 270 can be applied to fill in otherwise missing demographic information, resulting in better responses to demographic queries.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating a user classifier model, the method comprising:
 for each viewer of a plurality of viewers of digital videos, the viewers including viewers from a plurality of different households, and for a demographic attribute:
  identifying a value of the demographic attribute for the viewer;
  identifying a period of time during which the viewer viewed digital videos via a video hosting service;
  identifying a plurality of digital videos viewed by the viewer during the identified period of time;
  for the identified period of time, determining a set of features corresponding to the viewed digital videos, the features comprising content features derived from audiovisual content of the plurality of digital videos viewed during the period, and
   view-block features related to a division of the plurality of digital videos into subsets of videos viewed within a threshold amount of time of each other; and
  associating the determined set of features with the demographic attribute value; and
 for each demographic attribute value of a plurality of the demographic attribute values identified for the demographic attribute, training, by a computer processor, a user classifier model for the value of the demographic attribute using the sets of features associated with the demographic attribute value as input for an ensemble classifier training algorithm.

2. The computer-implemented method of claim 1, further comprising:
 for an anonymous viewer for whom a value of the demographic attribute is not already known, identifying a period of time during which the anonymous viewer viewed videos;
 identifying a plurality of videos viewed by the anonymous viewer during the identified period;
 determining a set of features for the period of time comprising at least one of distributions of attributes of the plurality of videos viewed during the period, and view-block features related to a division of the plurality of videos into a set of view-blocks, each view-block defining a subset of videos viewed within a threshold amount of time of each other; and
 determining whether the anonymous viewer has the demographic attribute value by applying the user classifier model for the demographic attribute value to the determined set of features.

3. The computer-implemented method of claim 1, wherein the features include at least one of a set consisting of: a distribution of viewings of the plurality of videos viewed by the viewer over hours of a day, and a distribution of viewings of the plurality of videos viewed by the viewer over days of a week.

4. The computer-implemented method of claim 1, wherein the view-block features comprise distributions of viewings of the plurality of videos viewed by the viewer over the view-blocks.

5. The computer-implemented method of claim 1, wherein the view-block features comprise at least one of a set consisting of: an average number of videos viewed per view-block, a median time duration of the view-blocks, and a total number of the view-blocks.

6. The computer-implemented method of claim 1, wherein identifying a value of the demographic attribute for the viewer comprises identifying the value in a user profile of the viewer, the value in the user profile having been specified by the user.

7. The computer-implemented method of claim 1, wherein the set of features comprises distributions of attributes of the plurality of digital videos viewed during the period.

8. The computer-implemented method of claim 7, wherein the distributions of attributes comprise distributions of demographic attribute values of uploaders of the plurality of videos viewed by the viewer.

9. The computer-implemented method of claim 7, further comprising:
   obtaining a set of category scores for each of the plurality of videos viewed by the viewer by applying a set of category classifier models to the plurality of videos viewed by the viewer;
   wherein the distributions of attributes comprise distributions of categories represented by the category scores.

10. The computer-implemented method of claim 7, further comprising:
    obtaining, for each video of the plurality of videos viewed by the viewer, a score for a demographic attribute value by applying a video classifier model to the video, the video classifier model corresponding to the demographic attribute value and producing a score representing how strongly the video represents the demographic attribute value; and
    forming a demographic distribution of the scores;
    wherein the distributions of attributes comprise the demographic distribution.

11. A non-transitory computer-readable storage medium having executable computer program instructions embodied therein for generating a user classifier model, actions of the computer program instructions comprising:
    for each viewer of a plurality of viewers of digital videos, the viewers including viewers from a plurality of different households, and for a demographic attribute:
      identifying a value of the demographic attribute for the viewer;
      identifying a period of time during which the viewer viewed digital videos via a video hosting service;
      identifying a plurality of digital videos viewed by the viewer during the identified period of time;
      for the identified period of time, determining a set of features corresponding to the viewed digital videos, the features comprising:
        view-block features related to a division of the plurality of digital videos into subsets of videos viewed within a threshold amount of time of each other; and
      associating the determined set of features with the demographic attribute value; and
    training a user classifier model for a value of the demographic attribute using the sets of features associated with the demographic attribute value.

12. The non-transitory computer-readable storage medium of claim 11, the actions further comprising:
    for an anonymous viewer for whom a value of the demographic attribute is not already known, identifying a period of time during which the anonymous viewer viewed videos;
    identifying a plurality of videos viewed by the anonymous viewer during the identified period;
    determining a set of features for the period of time comprising at least one of distributions of attributes of the plurality of videos viewed during the period, and view-block features related to a division of the plurality of videos into a set of view-blocks, each view-block defining a subset of videos viewed within a threshold amount of time of each other; and
    determining whether the anonymous viewer has the demographic attribute value by applying the user classifier model for the demographic attribute value to the determined set of features.

13. The non-transitory computer-readable storage medium of claim 11, wherein the features include at least one of a set consisting of: a distribution of viewings of the plurality of videos viewed by the viewer over hours of a day, and a distribution of viewings of the plurality of videos viewed by the viewer over days of a week.

14. The non-transitory computer-readable storage medium of claim 11, wherein the view-block features comprise distributions of viewings of the plurality of videos viewed by the viewer over the view-blocks.

15. The non-transitory computer-readable storage medium of claim 11, wherein the view-block features comprise at least one of a set consisting of: an average number of videos viewed per view-block, a median time duration of the view-blocks, and a total number of the view-blocks.

16. The non-transitory computer-readable storage medium of claim 11, wherein the features comprise distributions of demographic attribute values of uploaders of the plurality of videos viewed by the viewer.

17. A computer system for generating a user classifier model, the system comprising:
    a computer processor; and
    a computer-readable storage medium having executable computer program instructions embodied therein that when executed by the computer processor perform actions comprising:
      for each viewer of a plurality of viewers of digital videos, the viewers including viewers from a plurality of different households, and for a demographic attribute:
        identifying a value of the demographic attribute for the viewer;
        identifying a period of time during which the viewer viewed digital videos via a video hosting service;
        identifying a plurality of digital videos viewed by the viewer during the identified period of time;
        for the identified period of time, determining a set of features corresponding to the viewed digital videos, the features comprising at least one feature selected from the group consisting of:
          distributions of attributes of the plurality of digital videos viewed during the period, and
          view-block features related to a division of the plurality of digital videos into subsets of videos viewed within a threshold amount of time of each other; and
        associating the determined set of features with the demographic attribute value; and
      training a user classifier model for a value of the demographic attribute using the sets of features associated with the demographic attribute value.

18. The computer system of claim 17, the actions further comprising:
    obtaining a set of category scores for each of the plurality of videos viewed by the viewer by applying a set of category classifier models to the plurality of videos viewed by the viewer;
    wherein the distributions of attributes comprise distributions of categories represented by the category scores.

19. The computer system of claim 17, the actions further comprising:
- obtaining, for each video of the plurality of videos viewed by the viewer, a score for a demographic attribute value by applying a video classifier model to the video, the video classifier model corresponding to the demographic attribute value and producing a score representing how strongly the video represents the demographic attribute value; and
- forming a demographic distribution of the scores;
- wherein the distributions of attributes comprise the demographic distribution.

20. The computer system of claim 17, wherein identifying a value of the demographic attribute for the viewer comprises identifying the value in a user profile of the viewer.

* * * * *